US009495766B2

(12) United States Patent
Smolic et al.

(10) Patent No.: US 9,495,766 B2
(45) Date of Patent: Nov. 15, 2016

(54) SIMULATING COLOR DIFFUSION IN A GRAPHICAL DISPLAY

(71) Applicant: Disney Enterprises, Inc., Burbank, CA (US)

(72) Inventors: Aljoša Smolic, Zurich (CH); Oliver Wang, Zurich (CH); Nicolas Märki, Aarau (CH)

(73) Assignees: DISNEY ENTERPRISES, INC., Burbank, CA (US); ETH ZURICH (EIDGENOESSISCHE TECHNISCHE HOCHSCHULE ZURICH, Zurich (CH)

( * ) Notice: Subject to any disclaimer, the term of this patent is extended or adjusted under 35 U.S.C. 154(b) by 0 days.

(21) Appl. No.: 14/151,612

(22) Filed: Jan. 9, 2014

(65) Prior Publication Data

US 2015/0193950 A1    Jul. 9, 2015

(51) Int. Cl.
  *G06T 15/60* (2006.01)
  *G06T 11/00* (2006.01)
  *G06T 7/00* (2006.01)
  *G09G 5/02* (2006.01)
  *G06F 3/0481* (2013.01)

(52) U.S. Cl.
  CPC ............. *G06T 11/001* (2013.01); *G06T 15/60* (2013.01)

(58) Field of Classification Search
  CPC combination set(s) only.
  See application file for complete search history.

(56) References Cited

U.S. PATENT DOCUMENTS

| 4,755,870 | A | 7/1988 | Wilson et al. | |
|---|---|---|---|---|
| 5,592,597 | A * | 1/1997 | Kiss | 345/419 |
| 2003/0117408 | A1* | 6/2003 | Forsline et al. | 345/581 |
| 2007/0216684 | A1* | 9/2007 | Hsu | 345/441 |
| 2009/0033673 | A1* | 2/2009 | Siegel et al. | 345/582 |
| 2009/0033674 | A1* | 2/2009 | Murrah et al. | 345/584 |
| 2010/0272367 | A1* | 10/2010 | Criminisi et al. | 382/195 |
| 2012/0092357 | A1* | 4/2012 | Wang et al. | 345/581 |
| 2014/0229873 | A1* | 8/2014 | Tremblay et al. | 715/771 |

OTHER PUBLICATIONS

53, App of the Year!, Dec. 13, 2012, 5 pages, <http://news.fiftythree.com/post/37848614000/app-of-the-year-apple-has-named-paper-ipad-app>.

Wacom, CINTIQ 24HD touch Pen Display, 11 pages, 2015, <https://www.wacom.com/en-es/products/pen-displays/cintiq-24-hd-touch>.

(Continued)

*Primary Examiner* — Wesner Sajous
(74) *Attorney, Agent, or Firm* — Patterson + Sheridan, LLP (57) ABSTRACT

As described herein, an electronic device with a display screen may simulate the color diffusion that occurs in a physical painting process. For instance, the user may perform one or more actions that simulate a brushstroke on the display screen such as swiping a touch-sensitive area or dragging a cursor across the screen. The electronic device then calculates a geodesic distance between a pixel inside a region defined by the brushstroke and a pixel located outside this region based on the physical distance between the two pixels and a weighting factor that varies depending on whether an image boundary is between the two pixels. Based on the geodesic distance, the electronic device uses a color diffusion relationship that defines the effect of the color of the brushstroke on the pixel and a time delay controlling when the color of the brushstroke reaches the pixel in order to simulate color diffusion.

21 Claims, 8 Drawing Sheets

(56) References Cited

OTHER PUBLICATIONS

Fern, Hayley, Silk Painting Workshop for adults—Book Now, Feb. 8, 2011, 2 pages, <http://hayleyfemarts.blogspot.ch/2011/02/silk-painting-workshop-for-adults-book.html>.
Criminisi, Antonio et al., Geodesic Image and Video Editing, ACM Transactions on Graphics, Aug. 2011, 15 pages, ACM, New York, United States.
Reifsnyder, Abigail, Coloring Old Movies: Foes See Red, Backers See Green, Chicago Tribune, Aug. 29, 1986, 6 pages, <http://articles.chicagotribune.com/1986-08-29/entertainment/8603050091_1_wilson-markle-constance-bennett-laurel-and-hardy-movie>.
Levin, Anat et al., Colorization Using Optimization, Proceedings of ACM SIGGRAPH, vol. 23, Issue 3, Aug. 8, 2014, 39 pages, ACM, New York, United States.
Chen, Xiaowu et al., Manifold Preserving Edit Propagation, Proceedings of ACM SIGGRAPH Asia, Nov. 1, 2012, 7 pages, vol. 31, Issue 6, ACM, New York, United States.
Horiuchi, Takahiko et al., Proceedings of 13th Colorization for Monochrome Image with Texture, Color and Imaging Conference, 6 pages, Jan. 1, 2005, Springfield, United States.
Yatziv, Liron et al., Fast Image and Video Colorization Using Chrominance Blending, IEEE Transactions on Image Processing, vol. 15, Issue 5, May 2006, 16 pages, IEEE, Piscataway, United States.
Sagiv, Chen et al., Gabor-Space Geodesic Active Contours, Proceedings of the Second International Workshop on Algebraic Frames for the Perception-Action Cycle, Sep. 10, 2000, 10 pages, Springer-Verlag, London, United Kingdom.
Chen, Tongbo et al., Grayscale Image Matting and Colorization, Proceedings of Asian Conference on Computer Vision, Jan. 2004, 6 pages, Jeju Island, Korea.
Sykora, Danie., LazyBrush, YouTube, uploaded Apr. 15, 2011, <https://www.youtube.com/watch?v=XTUefe5HGKU>.
Welsh, Tomihisa et al., Transferring Color to Greyscale Images, Proceedings of the 29th annual conference on computer graphics and interactive techniques, vol. 21, Issue 3, Jul. 23, 2002, 4 pages, ACM, New York, United States.
Irony, R., Colorization by Example, Proceedings of the Sixteenth Eurographics conference on Rendering Techniques, Jun. 29, 2005, 10 pages, Eurographics Association Aire-la-Ville, Geneva, Switzerland.
Charpiat, Guillaume et al., Automatic Image Colorization via Multimodal Predictions, Proceedings of the 10th European Conference on Computer Vision: Part III, Oct. 12, 2008, 14 pages, Springer-Verlag, Berlin, Germany.
Chia, Alex Yong-Sang et al, Semantic Colorization with Internet Images, Proceedings of the 2011 SIGGRAPH Asia Conference, Dec. 12, 2011, 7 pages, ACM, New York, United States.
Dannen, Chris, The Magical Tech Behind Paper for iPad's Color-Mixing Perfection, Fast Company, Nov. 8, 2012, <http://www.fastcolabs.com/3002676/open-company/magical-tech-behind-paper-ipads-color-mixing-perfection>.
Chu, Nelson et al., Detail-Preserving Paint Modeling for 3D Brushes, Proceedings of the 8th International Symposium on Non-Photorealistic Animation and Rendering, Jun. 7, 2010, 8 pages, ACM, New York, United States.
Briggs, David, The Dimensions of Colour, retrieved Dec. 15, 2015, <http://www.huevaluechroma.com/061.php>.
Microsoft, Fresh Paint, retrieved Jan. 4, 2016, 3 pages, <http://apps.microsoft.com/windows/en-us/app/fresh-paint/1926e0a0-5e41-48el-ba68-be35f2266a03>.
Jones, Francine Dufour, Silk Painting Gallery, 3 pages, <http://silkpaintinggallery.com/>.
Apple, retrieved Jan. 4, 2016, 12 pages, <http://www.apple.com/ipad/>.
Apple, retrieved Jan. 4, 2016, 6 pages, <http://www.apple.com/ios/>.
Luan, Qing et al., Natural Image Colorization, Proceedings of the 18th Eurographics conference on Rendering Techniques, Jun. 25, 2007, 12 pages, Eurographics Association Aire-la-Ville, Switzerland.
Qu, Yingge, Manga Colorization, ACM Transactions on Graphics, Jul. 30, 2006, vol. 25, Issue 3, 7 pages, ACM, New York, United States.
Sykora, Daniel et al., Unsupervised Colorization of Black-and-White Cartoons, Proceedings of the 3rd international symposium on Non-photorealistic animation and rendering, 7 pages, Jun. 7, 2004, ACM, New York, United States.
Dannen, Chris, The Magical Tech Behind Paper for iPad's Color-Mixing Perfection, Fast Company, Nov. 8, 2012, 15 pages, <http://www.fastcolabs.com/3002676/open-company/magical-tech-behind-paper-ipads-color-mixing-perfection>.
Bai, Xue et al., A Geodesic Framework for Fast Interactive Image and Video Segmentation and Matting, Journal of Computer Vision, vol. 82, Issue 2, Apr. 2009, 8 pages, Kluwer Academic Publishers, Hingham, United States.
acholl980, Siskel & Ebert & The Movies-Colorization, Hollywood's New Vandalism (1of4), YouTube, uploaded Mar. 5, 2011, <https://www.youtube.com/watch?v=YpT1DkBOnqo>.
Kim, Tae Hoon et al., Edge-preserving colorization using data-driven random walks with restart, Proceedings of the 16th IEEE international conference on Image processing, Nov. 7, 2009, pp. 1641-1644, IEEE, Piscataway, United States.
Jacob, V G et al., Colorization of grayscale images and videos using a semiautomatic approach, Proceedings of the 16th IEEE international conference on Image processing, Nov. 7, 2009, IEEE, Piscataway, United States.
Konushin, Vadim et al., Interactive image colorization and recoloring based on coupled map lattices, IEEE International conference on Computer-Aided Design and Computer Graphics, Aug. 2009, pp. 146-149, IEEE, Piscataway, United States.
Dong, Yi et al., Interactive local color transfer based on Coupled Map Lattices, 11th IEEE International Conference on Computer-Aided Design and Computer Graphics, pp. 146-149, Aug. 2009, IEEE, Piscataway, United States.
Liu, Xiaopei et al, Intrinsic Colorization, Proceedings of ACM SIGGRAPH, vol. 27, No. 5, Dec. 10, 2008, 24 pages, ACM, New York, United States.
Lin, Ming et al, Physically based virtual painting, Interactive immersion in 3D graphics, vol. 47, Issue 8, Aug. 1, 2004, ACM, New York, United States.
Nie, Dongdong et al., Grey-Scale Image Colorization by Local Correlation Based Optimization Algorithm, Proceedings of the 8th international conference on Visual Information and Information Systems, Jul. 5, 2005, 11 pages, ACM, New York, United States.

* cited by examiner

SIMULATING COLOR DIFFUSION IN A GRAPHICAL DISPLAY

BACKGROUND

Field of the Invention

Embodiments presented in this disclosure generally relate to simulating paint diffusion in a graphical display, and more specifically, to using a geodesic distance and a time weighting component to simulate paint diffusion in a material.

Description of the Related Art

Some artwork is created using materials that permit paint to diffuse (or spread). One such example is silk painting where an artist paints silk stretched on a frame using a mixture of alcohol and dye. The paint spreads due to a diffusion process. Moreover, the artist can draw thin lines of wax or gutta (a thick substance made from rubber) to define barriers for the diffusion process. A few rough brushstrokes are then sufficient to finish small details that would otherwise be tedious to complete manually. That is, instead of physically contacting every portion of the silk the artist wishes to paint, she simply applies a brushstroke near a region and watches as the paint diffuses from the original brushstroke to the barriers. Painting tools or applications on electronic devices, however, are unable to recreate the same experience as paint diffusion when painting on silk or using watercolors.

SUMMARY

Embodiments presented herein include a method and a computer program product. The method and program product identify a location in a display screen where a user action simulates a brushstroke and determine, based on the location of the simulated brushstroke, a geodesic distance between a first pixel in the location and a second pixel outside of the location in the display screen. The method and computer program product determine a contribution of a color associated with the simulated brushstroke to the second pixel based on a color diffusion relationship comprising (i) a color diffusion component defining, based on the geodesic distance, an effect of the color of the simulated brushstroke on a color of the second pixel and (ii) a time component providing, based on the geodesic distance, a delay between when the simulated brushstroke is identified and when the color associated with the simulated brushstroke affects the color of the second pixel.

Another embodiment includes a system including a display screen, a computer processor and a memory containing a program that, when executed on the computer processor, performs an operation. The operation includes identifying a location in the display screen where a user action simulates a brushstroke and determining, based on the location of the simulated brushstroke, a geodesic distance between a first pixel in the location and a second pixel outside of the location in the display screen. The operation includes determining a contribution of a color associated with the simulated brushstroke to the second pixel based on a color diffusion relationship comprising a color diffusion component defining, based on the geodesic distance, an effect of the color of the simulated brushstroke on a color of the second pixel and a time component providing, based on the geodesic distance, a delay between when the simulated brushstroke is identified and when the color associated with the simulated brushstroke affects the color of the second pixel.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

To simulate paint diffusion, an electronic device may interpret user actions as a brushstroke. For example, the electronic device may include a touch screen or an input device that allows the user to perform an action (e.g., swiping a finger or dragging a cursor) that represents a painter applying a brushstroke to a material (e.g., a canvas). In response to the simulated brushstroke, the electronic device calculates a physical distance from the location of the user action on the screen to pixels in the screen that are outside a region defined by the simulated brushstroke. In one embodiment, the device uses the physical distance to calculate a geodesic distance representing a distance in curved space. The curved space may be based on image content—e.g., difference in color or displayed images. For instance, to calculate the geodesic distance, the electronic device may combine the physical distance with a weighting factor. This weighting factor may be based on a color difference between pixels or a boundary (like the wax or gutta boundaries) that increase the distance between pixels, and thus, acts like a barrier to color diffusion.

Using the geodesic distances, the electronic device may use a time-based function that diffuses the color of the brushstroke in the display screen. That is, after making the brushstroke, the user can watch the color spread in the screen to pixels that are outside the region defined by the brushstroke—e.g., pixels that were not contacted when the user swiped her finger on a touch-sensitive display or pixels that did not overlap with a user controllable icon representing the paintbrush. Because the geodesic distance is weighted using a color difference or boundary, the color diffusion may be stopped or limited. For example, the electronic device may display an outline of a predefined image that the user can color using simulated brushstrokes. The outline of the image may be used as a boundary to affect the geodesic distances calculated by the electronic device. Thus, if the user applies a brushstroke on one side of the outline in the image, the color may diffuse until it reaches the outline but the likelihood of the color diffusing across the outline is greatly reduced because of the weighted geodesic distances.

In one embodiment, the outline of an image is not displayed on the display screen. Nonetheless, the electronic device may use the outline of the image to calculate geodesic distances. Thus, as the user performs simulated brushstrokes, the color diffusion process is nonetheless limited or stopped by the boundaries of the image. Doing so reveals the image to the user and creates a different user experience relative to displaying the image to the user.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
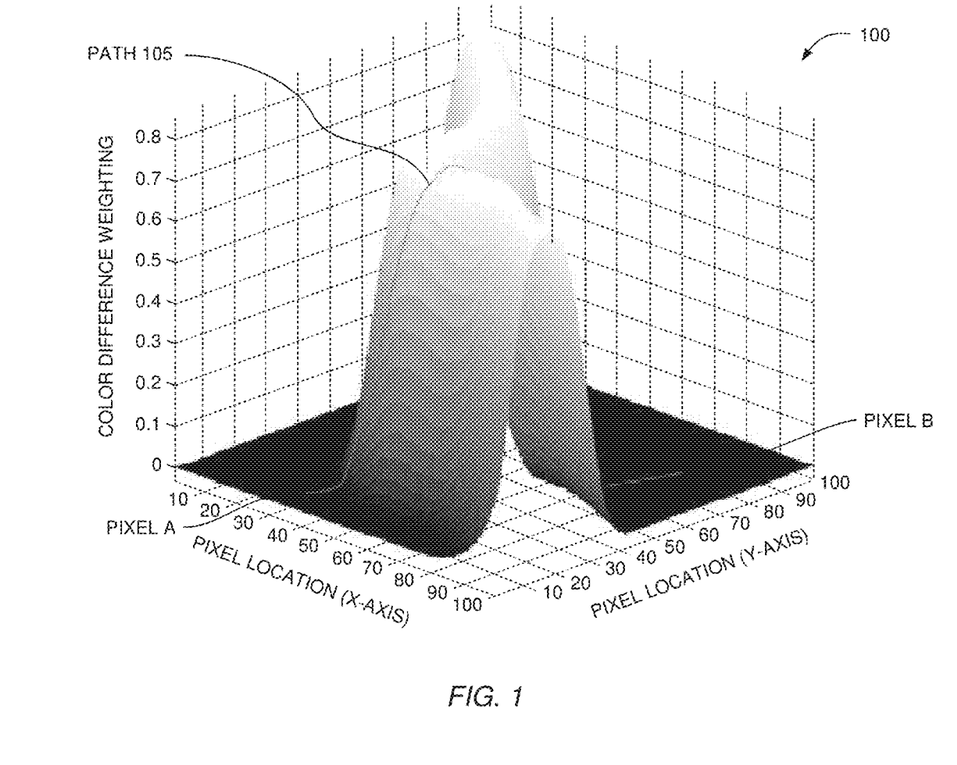
FIG. 1 illustrates a geodesic distance, according to one embodiment described herein.

FIG. 1 illustrates a geodesic mapping in chart 100, according to one embodiment described herein. Specifically, the bottom plane of the chart 100 defines locations of pixels (e.g., X- and Y-axes coordinates) on a display screen of an electronic device (e.g., a computing device with a processor such as a smartphone, tablet, laptop, desktop computer with monitor, etc.). Moreover, the mapping also illustrates different colors of the pixels which ranges from black to white using a grayscale. The chart 100 includes a path 105 providing a geodesic distance between Pixel A and Pixel B. Instead of relying on the physical distance between Pixel A and Pixel B on the display screen, the geodesic distance is based on both the physical distance and a color difference weighting. As such, as the color difference between neighboring pixels increases, so does the geodesic distance between Pixels A and B along path 105. Using a color difference as weight for determining the geodesic distance enables the electronic device to, for example, detect boundaries (e.g., where the background pixels are white and the pixels in the borders are black) to aid color diffusion. In other embodiments, instead of using a color difference, the location of the boundaries may be used directly to affect the geodesic distances. For example, even if the pixels are the same color, because one of the pixels is used in a boundary, the electronic device may weigh the geodesic distance between the pixels accordingly—e.g., increase the geodesic distance between the two pixels.

FIGS. 2A-2E illustrates examples of calculating a physical distance between pixels and a simulated brushstroke, according to embodiments described herein. More specifically, FIGS. 2A-2E illustrate a map 200 of a plurality of pixels in a display screen of an electronic device. The map 200 is divided into a pixel grid where each block represents a pixel. The three pixels in group 205 correspond to an area where a user has simulated a brushstroke on the display screen. In one embodiment, the screen is touch-sensitive such that the user can use a digit (e.g., a finger tip) or a stylus to simulate a brushstroke by, e.g., swiping the screen. That is, group 205 includes the pixels where the user directly contacts (or hovers over) the display screen. In another embodiment, the electronic device may include an input device (e.g., mouse, joystick, trackball, touch pad, eye tracking system, etc.) controlled to simulate the brushstroke. In such case, the display screen may display a cursor which the user controls using the input device. For instance, the user may use a mouse to move the icon to a desired location on the screen. When the user wants to simulate a brushstroke on the screen, she presses down on one of the buttons and moves the mouse, and in turn, the icon across the screen. The icon could be a pointer, an image of a brush or part of a brush, a shape that indicates the diameter of the brushstroke, and the like.

Figures 2A, 2C:
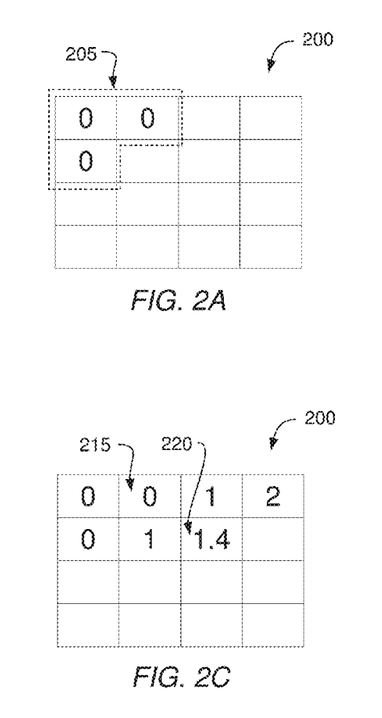
FIGS. 2A-2E illustrates calculating a physical distance between pixels and a simulated brushstroke, according to embodiments described herein.
Figures 2B, 2D:
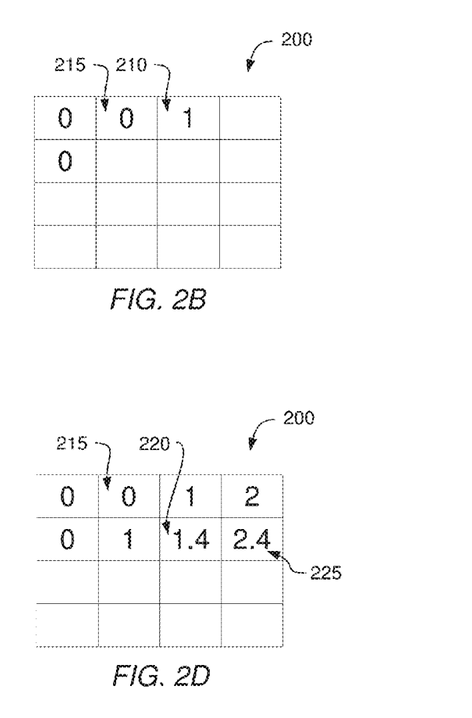

In response to this user input, the electronic device identifies pixels that are part of the brushstroke—e.g., the pixels in group 205. Based on this information, the electronic device iterates through pixels not within the simulated brushstroke to determine a physical distance between the pixels in the brushstroke and the pixels not in the brushstroke. In the example shown in FIGS. 2B-2E, the electronic devices begins at the top left-most pixel and iterates from left to right through the lines. As shown in FIG. 2B, the electronic device determines a distance (here measured in units based on the dimensions of the pixels) between the top, leftmost pixel 210 and the closest pixel in the brushstroke 210. Because pixel 210 is only one pixel away from the closest pixel 215 in the brushstroke—i.e., pixel 210 is adjacent to a pixel in the brushstroke—pixel 210 is assigned a physical distance of one. FIG. 2C illustrates determining the physical distance of a pixel 220 when the closet pixel 215 in the brushstroke is diagonal to pixel 220. Here, pixel 220 is a square root of two pixel lengths away from pixel 215, which is approximated to a distance of 1.4 pixels as shown.

Figure 2E:
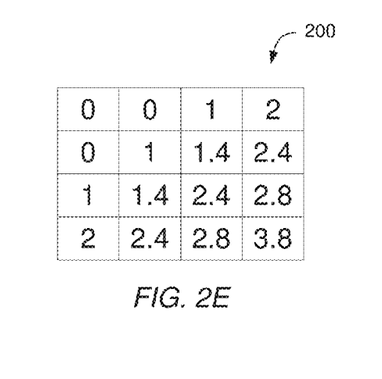

FIG. 2D illustrates an example of approximating the distance from pixel 225 to the closest pixel in the brushstroke—i.e., pixel 215. Here, because the shortest path from pixel 225 to pixel 215 intersects pixel 220, the physical distance of this path is the distance from pixel 225 to pixel 220 plus the distance from pixel 220 to pixel 215. Thus, the physical distance from pixel 225 to pixel 215 is one pixel length plus the square root of two pixel lengths for a total of approximately 2.4 pixel lengths. FIG. 2E illustrates the result of this particular method for calculating the physical distance of each of the pixels in the display screen 200 to the closest pixel in the brushstroke. Accordingly, in response to a user action simulating a brushstroke, the electronic device calculates a respective physical distance from the pixels not in the brushstroke to a pixel in the brushstroke.

In one embodiment, the electronic device may iterate through the pixels to calculate the physical distances differently than what is shown in FIGS. 2B-2E. For example, the electronic device may start at the bottom, right-most pixel and iterate from right to left up the rows. Or the electronic device may perform both techniques. Performing both techniques may be advantageous since the brushstroke may be at different locations on the touch screen. As such, in one embodiment, the electronic device may select the process for iterating through the pixels based on the location of the user interaction with the display screen. For example, if the user simulates a brushstroke on the bottom rightmost pixels, it may be more accurate to iterate from right to left rather than left to right as shown.

Moreover, the technique shown in FIGS. 2A-2E is only one technique for measuring distance between the pixels. The embodiments described herein may be used with any method for calculating a spatial distance between the pixels, for example, a straight-line measurement, determining an average distance for a group of pixels, and the like. In another embodiment, the system may use a color based metric for determining distance between pixels rather than a physical distance as shown here.

Figure 3:
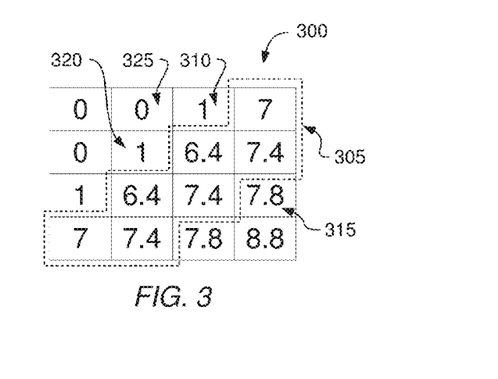
FIG. 3 illustrates a geodesic mapping based on the measured physical distance and an image boundary, according to one embodiment described herein.

FIG. 3 illustrates a geodesic distance mapping 300 based on the measured physical distance and an image boundary, according to one embodiment described herein. Using the physical distances shown in mapping 200 of FIG. 2E, the electronic device may combine these distances with a weighting factor to determine a geodesic distance for each pixel to generate the mapping 300. The pixels within group 305 are assumed to be pixels that form a boundary or a border, such as an outline of an image in the display screen or edges of a photograph taken using the electronic device. In one embodiment, the color of the pixels in group 305 may be black while the color of the pixels outside this group 305 is white. The electronic device may add a weight (shown here as five pixels lengths) to the physical distance of each of the pixels in group 305 to derive a geodesic distance for these pixels. The electronic device may then calculate the geodesic distances for the remainder of the pixels. For example, because the pixels of group 305 are between pixel 315 and pixel 320, the geodesic distance of pixel 315 is increased because of the boundary. In contrast, pixel group 305 is not between pixel 310 and its closest pixel 325. As such, the geodesic distance of pixel 310 is equivalent to the physical distance measured in FIGS. 2B-2E. In this manner, the mapping 300 corresponds to the mapping shown in FIG. 1 where the distance between pixels is not only affected by the spatial distance between the pixels but also a weighting factor. As mentioned previously, the weighting factor may be color differentiation of the pixels or a predefined boundary such as an outline of an image.

Although calculating the geodesic distance was explained in the order of first calculating the physical distance and then calculating the geodesic distance by considering a weighting factor, this was for ease of explanation only. It is equally plausible to first calculate the weighting factor for each pixel and then iterate through the pixels to combine the weighting factor with the physical distance to yield the geodesic distance. Alternatively, the electronic device may determine the geodesic distance by simultaneously calculating the physical distance and the weighting factor for a pixel. For example, calculating the geodesic distance may not require directly calculating the physical distance.

Figure 4:
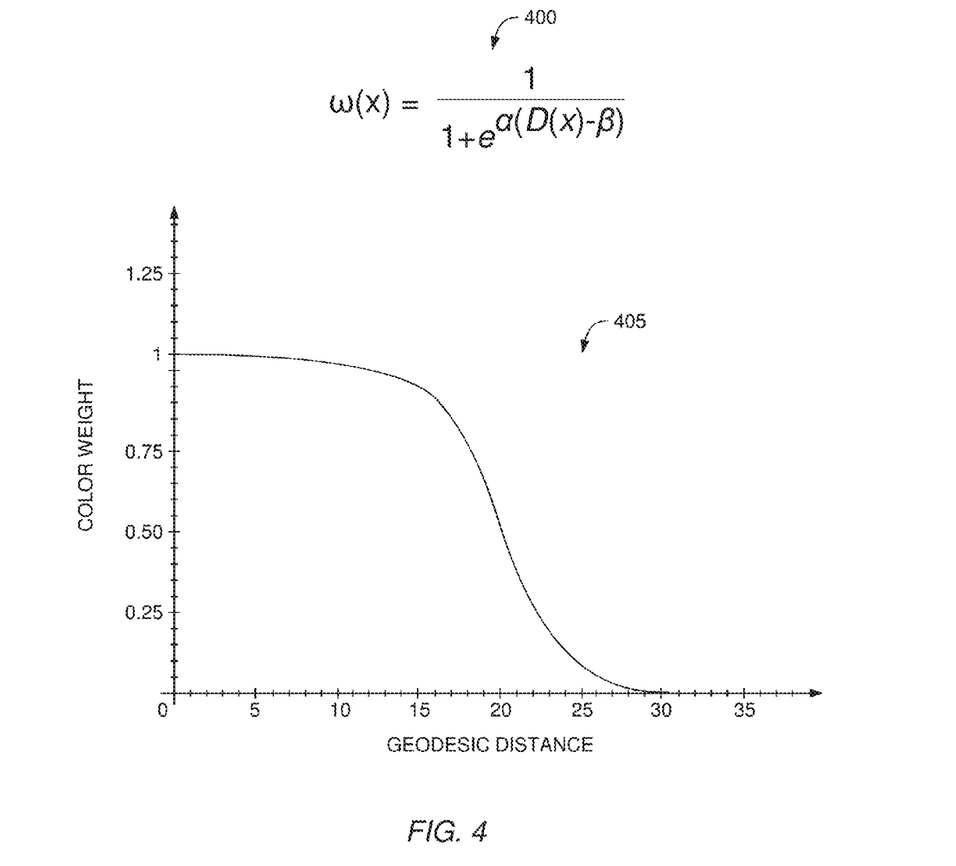
FIG. 4 illustrates a weighting function for controlling color diffusion, according to one embodiment described herein.

FIG. 4 illustrates a weighting function for controlling color diffusion, according to one embodiment described herein. As shown, FIG. 4 includes a color-weight equation 400 and a chart 405 that illustrates the effect the color of the brushstroke has on a pixel relative to the pixel's geodesic distance. Specifically, chart 405 is a graphical plot of equation 400 for set values of the parameters alpha and beta.

Each simulated brushstroke made by a user on the electronic device has a particular color just like when an artist applies paint to a material. The Y-axis of chart 405 represents the effect or weight the brushstroke color has on the pixel relative to the pixel's geodesic distance from the brushstroke. As shown in equation 400 and chart 405, as the geodesic distance of the pixel increases, the effect of the color in the brushstroke on the color of the pixel decreases. Thus, equation 405 simulates how paint diffusion occurs in real-world painting techniques (e.g., silk painting or using watercolors) where parts of the material closer to the brushstroke are affected more by the applied paint in the brushstroke relative to parts of the material that are further from the brushstroke.

The parameters alpha and beta are customizable depending on the particular implementation. For example, alpha controls the slope of the diffusion as it transitions from a maximum to a minimum. The greater the value of alpha, the greater the slope, which yields a more visually identifiable boundary or limit to the color diffusion. On the other hand, the beta value controls how far the color spreads in the screen. As the beta value increases, so does the limits of the color diffusion. In one embodiment, the parameters may be adjusted to match the properties of real-world materials. For instance, the values for alpha and beta may be different depending on whether the electronic device is modeling color diffusion in silk versus paper. In another embodiment, the alpha and beta values may be used to model an amount of paint applied by the brushstroke or different types of paint brushes (or other paint application tools). For example, to simulate applying a greater amount of paint with the brushstroke, the beta and/or alpha values may be increased so that the colors spreads out further or has a greater affect on the color of the pixels proximate to the brushstroke.

Figure 5:
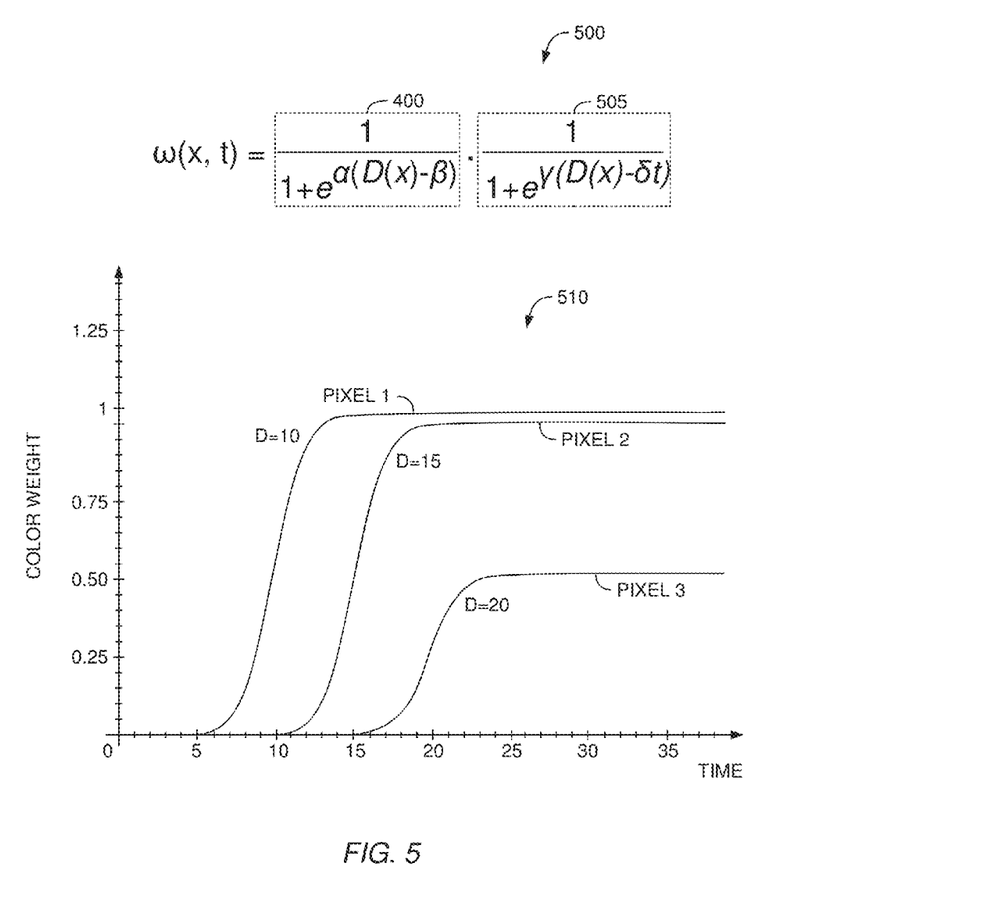
FIG. 5 illustrates a weighting function for performing color diffusion using a time delay component, according to one embodiment described herein.

FIG. 5 illustrates a weighting function for performing color diffusion using a time delay component, according to one embodiment described herein. Specifically, a color diffusion equation 500 (e.g., a color diffusion relationship) illustrates combining the color-weight function in FIG. 4 with a time-based component 505 which also varies based on the geodesic distance. That is, the diffusion function 500 includes a color-weight component 400 that is multiplied with the time-based component 505 which both depend on the geodesic distance of the pixel (D(x)).

The chart 510 illustrates respective plots of diffusion equation 500 for three pixels with three different geodesic distance values—10 for Pixel 1, 15 for Pixel 2, and 20 for Pixel 3. For clarity, the alpha and beta values for equation 500 are assumed to be same for those used to generate chart 405 of FIG. 4. Referring back to FIG. 4, the color weight for a pixel with a geodesic distance of 10 is only slightly greater than a pixel with a geodesic distance of 15. Thus, returning to chart 510 in FIG. 5, the maximum color weight for Pixel 1 (which has a geodesic distance of 10) is slightly greater than Pixel 2 (which has a geodesic distance of 15) as shown by the Y-axis. The color-weight component 400 determines the maximum color weight of a particular pixel based on its geodesic distance. In this example, Pixel 1 would be more affected by the color in the brushstroke than Pixel 2.

The time before the color of the brushstroke appears in the particular pixel (i.e., affects the color of a neighboring pixel) is determined by the time-based component 505 in equation 500. That is, even though color from the brushstroke affects Pixel 2 only slightly less than Pixel 1, the color does not appear in Pixel 2 until a later time. In this manner, the time-based component 505 models the time required for paint to diffuse in a material. That is, just like in a real-world material, the color of the simulated brushstroke first appears at locations that are closer to the brushstroke before spreading to locations that are further away. Accordingly, because Pixel 3 is the furthest from the brushstroke as measured from the closest part of the brushstroke, the color affects this pixel last. Moreover, referring back to chart 405, the color weight is much less at a geodesic distance of 20 relative to a geodesic distance of 10 or 15. Thus, the contribution of the brushstroke's color to Pixel 3 will be less. To model this, the intensity or brightness of the brushstroke's color at Pixel 3 is reduced relative to the intensity or brightness of the color at Pixels 1 and 2.

The parameters nu and gamma are configurable in order to adjust how the color diffusion spreads with respect to time. Like the parameters of the color-weight component 400, the nu and gamma values may be adjusted based on the material or paint being simulated by the electronic device. That is, some materials permit paint to diffuse faster than others while different types of paint may have different diffusion rates when applied to the same material.

Furthermore, to model the uneven texture of some materials, the diffusion function 500 may include a noise component. The noise component may randomly (or periodically) modify the color of the brushstroke contributed to the pixels. Thus, like real paper where different parts of the paper may be less affected as the paint diffuses, the display screen may have pixels or groups of pixels where the contribution of the brushstroke's color is artificially reduced by this noise component even if, for example, the color-weight component 400 of equation 500 dictates that the color should have a maximum affect on the pixel.

Figure 6A:
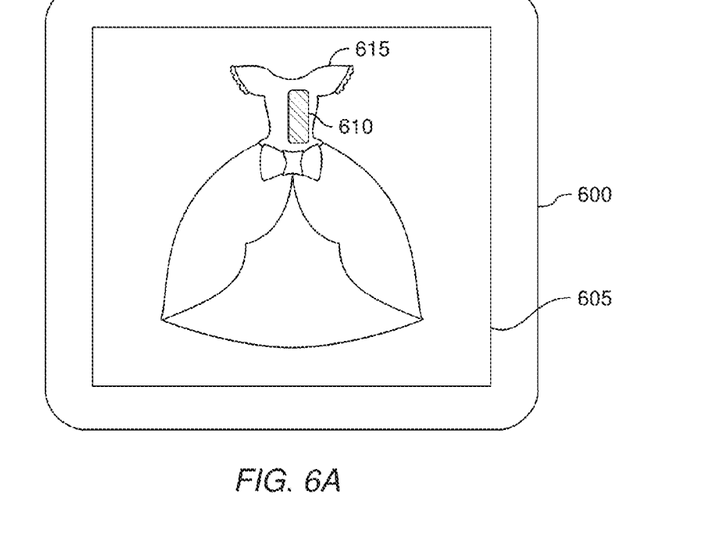
FIGS. 6A-6C illustrate time-based color diffusion in an electronic display, according to embodiments described herein.
Figure 6B:
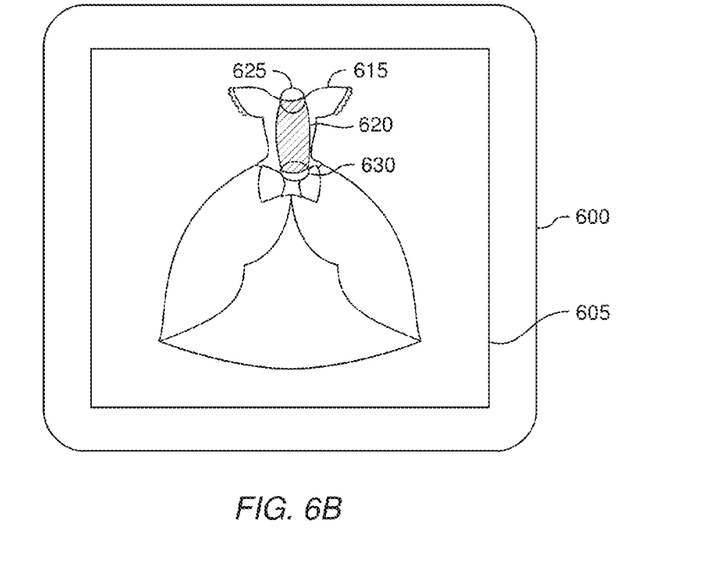
Figure 6C:
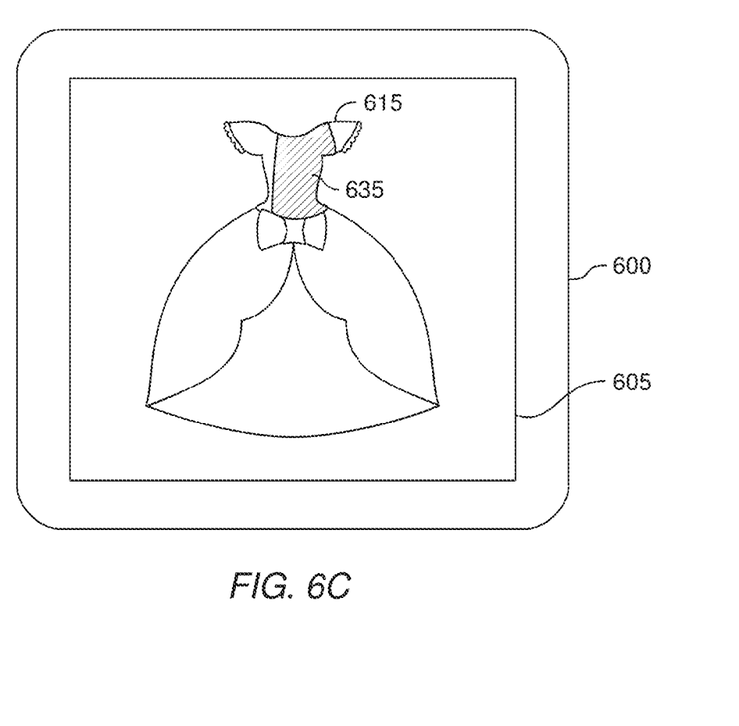

FIGS. 6A-6C illustrate time-based color diffusion in an electronic display, according to embodiments described herein. Specifically, FIGS. 6A-6C illustrate the perspective of a user as an electronic device 600 simulates color diffusion on a display screen 605. The electronic device 600 shown may be just a portion of a computer system. For example, the electronic device 600 may be a monitor that is coupled to a desktop computer or a remote server. Alternatively, the device 600 may be a computing device with an integrated display screen 605 such as a tablet computer, smartphone, or laptop. In either case, although not shown, the computing system includes a processor and memory capable of performing the embodiments described herein. Furthermore, the display screen 605 may be touch sensitive, or the electronic device 600 may include one or more input devices that permit the user to simulate brushstrokes on the display screen 605 (or some combination of both).

FIG. 6A illustrate a user performing an action that simulates the brushstroke 610 in the display screen. The display screen may already display an image 615 which the user uses one or more brushstrokes to color. Although not shown, the display screen may provide a pallet of colors from which the user can choose to apply when making the simulated brushstrokes. As described above, the outline of the image 615 may be used to form a weighting factor when calculating the geodesic distances between the pixels outside of the brushstroke 610 and the closest pixel in the brushstroke 610.

FIG. 6B illustrate a point of time later than the point of time represented in FIG. 6A. Here, the borders of color diffusion 620 have expanded beyond the borders of the brushstroke 610 shown in FIG. 6A. That is, based on the calculated geodesic distance, the electronic device 600 may use the diffusion function 500 in FIG. 5 to determine two factors: first, when the color reaches a pixel, and second, how much the color of the brushstroke affects the color of the pixel. FIGS. 6B and 6C are intended to illustrate the first factor (i.e., a time delay) but are not intended to illustrate the second factor. That is, although FIGS. 6B and 6C illustrate that the contribution from the brushstroke on the color of the pixel is the same for all the pixels included within the hashed regions 610, 620, and 630, this does not need to be the case. As shown by FIG. 5, the electronic device may reduce the color weight as the geodesic distance decreases, thereby reducing the contribution of the color to the pixel. For example, the pixels in region 620 of FIG. 6B may have a greater intensity of the brushstroke color than the new pixels that were added to form region 635 in FIG. 6C. This will be described in more detail later.

As shown in FIGS. 6B and 6C, the color diffusion is stopped at the outline of the image 615. As described relative to FIG. 3, the geodesic distances for the pixels may be weighted to reduce the likelihood the color will diffuse across the outline of the image 615. For example, using chart 405 of FIG. 4 as an example, the brushstroke color only affects pixels that have a geodesic distance that is less than approximately 32—i.e., after a distance of 32, the color weight is substantially zero. Thus, any pixel with a value equal to or greater that this geodesic distance is unaffected by the brushstroke. By using the weighting factor when calculating the geodesic distance, the electronic device may assign the pixels that form the outline of the image 615 in region 625 and region 630 of FIG. 6B a geodesic distance that is equal to or greater than 32. Moreover, because the pixels on the other side of outline have to cross the outline in order to reach the brushstroke, it follows they too must have a geodesic distance that is greater than 32, and thus, remain unaffected by the color of the brushstroke. In this manner, the outline of the image 615 can act like a boundary to limit color diffusion.

However, as a user makes brushstrokes that are closer and closer to outline of the image 615, in one configuration, the color may diffuse across the outline to the pixels on the other side. For example, the weighting factor may be such that the factor only makes it less likely that a color will diffuse across a boundary, but not impossible. Again, using chart 405 of FIG. 4 as an example, the electronic device may not set the weighting factor such that any pixel in the outline of the image is always above 32. For instance, the electronic device may use a weighting factor of only 20 or 25 pixel lengths when calculating the geodesic distance. Thus, as the brushstroke moves closer to the outline such that the physical distance between the pixels is reduced, the geodesic distance may be below the 32 value (e.g., a color-weighting threshold) and some of the color from the brushstroke may diffuse across the outline of the image 615 onto pixels on the other side.

The likelihood the color will diffuse across the outline may be adjusted by tuning the weighting factor used when calculating the geodesic distance or by changing the color-weight component 400 of the equation 500 in FIG. 5. For example, to prevent any color diffusion across boundaries of an image, the electronic device may set the weighting factor associated with boundaries above the color-weighting threshold of the color-weight component 400 used in equation 500 in FIG. 5. Alternatively or additionally, the alpha and/or beta values in the color-weight component 400 may be adjusted such that this threshold is below the weighting factor used when calculating geodesic distance. In this manner, the electronic device can be configured to always prevent color diffusion across boundaries or permit some color diffusion when the geodesic distance is less than the color-weighting threshold of the color-weight component 400 in equation 500.

Although FIGS. 6A-6C illustrate displaying the image 615 to the user, in one embodiment, the image 615 may be invisible to the user (i.e., not rendered as part of the image displayed on a display screen) but known to the electronic device 600. That is, the image 615 may not be displayed to the user on the display screen 605, however, the electronic device may still base the weighting factor used when calculating the geodesic distance on the outline of the image 615. In this scenario, the color diffusion snapshots shown in FIGS. 6A-6C would work in the same way—i.e., the color diffusion is stopped in the regions 620 and 630—but the user is unable to see the outlines of the image 615. As the user continues to simulate brushstrokes, she can watch the color diffusion process begin to reveal the outline of the image based on how the invisible image affects the geodesic distance by stopping (or limiting) the color diffusion. By hiding the image from the user, she is provided with a different experience as each brushstroke may reveal more of the invisible image.

As mentioned earlier, FIGS. 6A-6C do not show pixels with varying color intensity. Nonetheless, the color intensity of the colors in the regions 620 and 635 may increase (or decrease) over time. As seen by comparing region 620 and region 635, some of the pixels in these regions are common to both regions. However, the contribution of the color of the brushstroke on these shared pixels (excluding the pixels in the brushstroke itself) may change between the time shown in FIGS. 6B and 6C. That is, as the color of the brushstroke diffuses, more and more of the color reaches the pixels outside of the brushstroke as defined by the color-weight component 400 of the color diffusion equation 500 in FIG. 5. As such, the pixels in common between regions 635 and 620 are more affected by the brushstroke's color at the time shown in FIG. 6C than these pixels were than in the time shown in FIG. 6B. For instance, the shared pixels may have a greater intensity or brightness from the brushstroke's color during the time snapshot in FIG. 6C than those same pixels did during the time snapshot illustrated in FIG. 6B.

In another embodiment, the intensity or brightness of the brushstroke's color in the region of the brushstroke 610 may decrease in FIGS. 6B and 6C relative to the time snapshot in FIG. 6A. This may model that the paint initially applied within region 610 has now diffused to the surrounding pixels shown by the expanded regions 620 and 635. Thus, as the color of the pixels surrounding the region of the initial brushstroke 610 become brighter during color diffusion, the color of the pixels in the region of the brushstroke 610 may become correspondingly dimmer.

Figure 7:
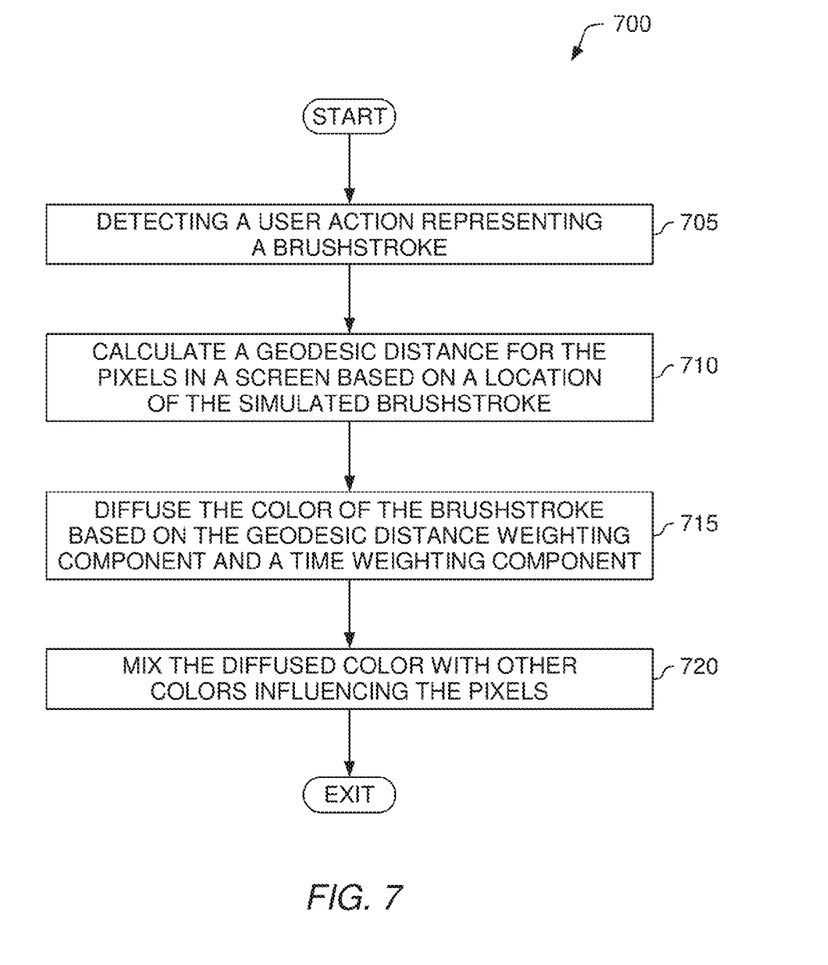
FIG. 7 illustrates a method for performing color diffusion in the electronic display based on a simulated brushstroke, according to one embodiment described herein.

FIG. 7 illustrates a method 700 for performing color diffusion in the display of the electronic device based on a simulated brushstroke, according to one embodiment described herein. At block 705, the electronic device detects a user action representing a brushstroke such as a swipe on a touch-sensitive screen or a dragging motion of a cursor across the screen. At block 710, the electronic device calculates a geodesic distance between the pixels in the screen that are not part of the brushstroke to the closest pixel in the brushstroke. In addition to considering the physical or spatial distance between the pixels in the display screen, the electronic device may use a weighting factor to represent boundaries in the screen. For instance, the weighting factor may be applied based on a color difference between neighboring pixels—e.g., boundary pixels may be black while neighboring pixels are white. Alternatively, the weighting factor may be applied when a pixel is part of a boundary such as an outline of a displayed or invisible image. The electronic device calculates the geodesic distance using the weighting factor and the physical distance. As such, a pixel may be close spatially to the brushstroke yet have a large geodesic distance to the brushstroke if there is a boundary separating the two pixels.

At block 715, the electronic device performs a time-based color diffusion process using the simulated brushstroke. In one embodiment, as shown in FIG. 5, the measured geodesic distance may be used in the weighting equation to define both the contribution of the color of the brushstroke to the pixels and the time delay before the color of the brushstroke begins to affect the pixels. That is, the color diffusion equation can be divided into two components: one for defining the color contribution or color weight and another for controlling the time required for the color to diffuse across the display screen.

After applying the brushstroke, the user can watch as the color from the brushstroke diffuses away from the brushstroke. As the color diffusion strikes a boundary such as an outline of an image (which may be visible or hidden from the user) the color diffusion process is stopped. Alternatively, the color may continue to diffuse across the boundary, but because of the added geodesic distance from the boundary, the contribution of the brushstroke's color may be noticeable greater on one side of the boundary than the other. Stated different, as the color bleeds across the boundary, the intensity of the color on the side of the boundary with the brushstroke may be noticeable greater than the intensity of the color on the other side—i.e., there is not a gradual decrease in the intensity of the color but rather a discrete drop in intensity relative to pixels adjacent to the boundary but on opposite sides.

At block 720, the electronic device may mix the contribution of the color of the brushstroke with other colors affecting each pixel. For example, some of the pixels may already have a color before the diffusion process reaches the pixel. Instead of simply replacing the color of the pixel with the color of the brushstroke, to better model real-life diffusion, the colors may mix. In another example, the user may make two brushstrokes with the same or different colors that may diffuse into the pixels simultaneously. Thus, as the contributions of the colors from the brushstrokes increase, the electronic device may continually mix the colors.

In one embodiment, the electronic device uses a color model that simulates the mixing of color in a physical painting process (e.g., watercolors or silk painting). For instance, the color model may be an additive/subtractive model or any other type of color model that simulates a physical mixing of colors. In this manner, the color model can weight and/or balance multiple simulated brushstrokes with the same or different color to determine a final color for the pixels in the display.

Figure 8A:
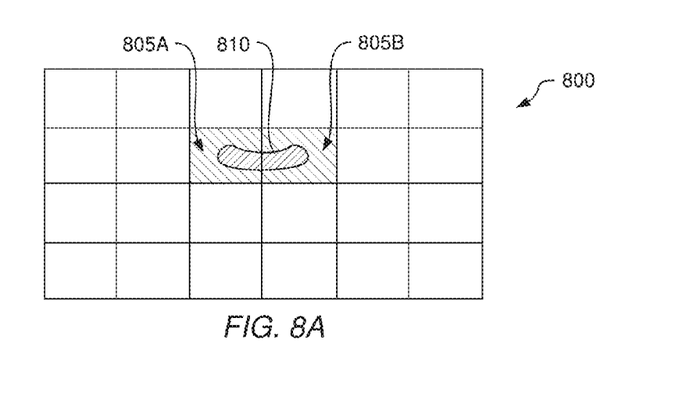
FIGS. 8A-8C illustrate performing a tiled geodesic distance calculation, according to embodiments described herein.

FIGS. 8A-8C illustrate a technique for performing a tiled geodesic calculation, according to embodiments described herein. As shown in FIG. 8A, a display 800 is logically divided into a grid including a plurality of tiles 805 that each contain a block of pixels. Instead of calculating the geodesic distance for all the pixels of the display 800, the electronic device may first calculate the geodesic distance for the pixels that are proximate to the brushstroke 810—e.g., the pixels in tiles 805A and 805B. To illustrate this, the area of the tiles 805A and 805B is shaded to illustrate that the electronic device has calculated the geodesic distance between the pixels in these tiles 805A-B and the closest pixels in the simulated brushstroke 810. Based on these geodesic distances, the electronic device performs color diffusion using, for example, method 700.

Figure 8B:
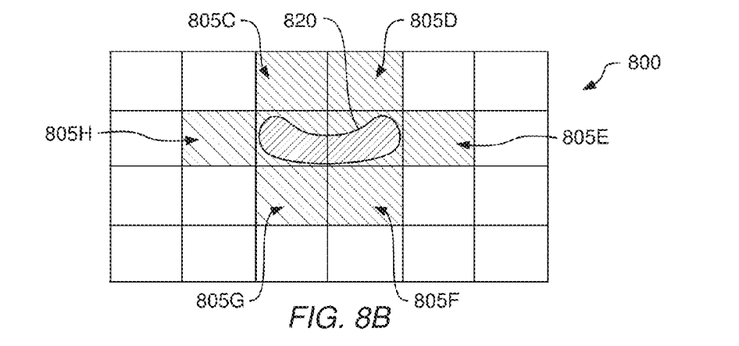

In FIG. 8B, the electronic device calculates geodesic distance for additional tiles 805 in the display 800 as the color diffusion process continues. Specifically, the electronic device calculates the geodesic distance for the pixels in tiles 805C-805H. For instance, the electronic device may monitor the border or extremes of the brushstroke 820 as its associated color spreads throughout the display 800. As the border of the brushstroke 820 approaches a tile 805, the electronic device may calculate the geodesic distance between the pixels in the tile and the closest pixel in the original brushstroke 810 in FIG. 8A. That is, the electronic device anticipates or predicts that the color of the original brushstroke 810 may diffuse to the tile 805 and thus calculates the geodesic distance for the pixels in that tile 805. Thus, the geodesic distances for the pixels in tiles 805A and 805B are calculated during a different time period than the pixels in tiles 805C-805H.

Figure 8C:
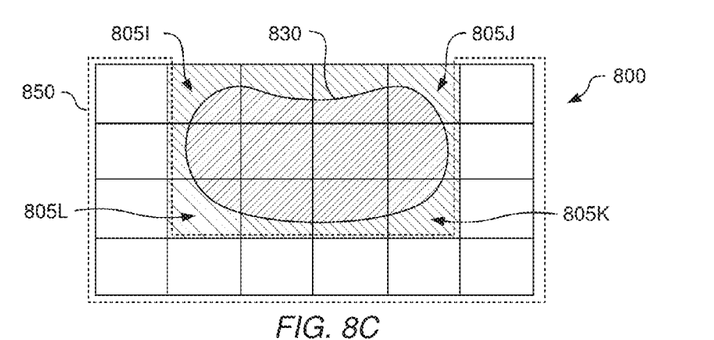

Like FIG. 8B, FIG. 8C also illustrates calculating the geodesic distance for additional tiles 805 in the display as the color of the brushstroke 830 spreads across the display 800. Here, the geodesic distances from the pixels in tiles 805I-805L are measured to the original brushstroke 810. Thus, using the geodesic distances, the electronic device is able to determine how the color of the brushstroke 830 affects the pixels in these tiles 805I-L.

One advantage of logically dividing up the display 800 into a grid of tiles permits the electronic device to independently calculate the geodesic distance for each tile or group of tiles. Moreover, the electronic device avoids calculating the geodesic distances for the pixels in tiles where the color of the simulated brushstroke has no substantial affect—e.g., the tiles in region 850. Calculating the geodesic distances in each tile as the color diffuses spreads means that that the color diffusion process may be able to begin faster relative to waiting until the electronic device determines the geodesic distance for all the pixels in all of the tiles 805. For electronic devices that have limited processing power (e.g., smartphones where processing power may be less than other electronic devices such as desktop computers or laptops), using the tiled approach shown in FIGS. 8A-8C allows the color diffusion process to occur with less of a delay after a user action simulates a brushstroke. Moreover, as the electronic device begins the color diffusion process, the device can continue to calculate the geodesic distances for the other tiles (e.g., tiles 805C-805H) in the background. Thus, as the color spreads to these tiles, the geodesic distances have already been calculated thereby further mitigating any delay.

Moreover, unlike calculating the geodesic distance for all the pixels, the technique shown in FIGS. 8A-8C may mean that the geodesic distances associated with the brushstroke 810 for some of the tiles (e.g., region 850) are never calculated. To do so, the electronic device may use one or more thresholds to determine when to proceed with calculating the geodesic distance for a tile 805 in the display. For example, the threshold may cause the electronic device to wait to calculate the geodesic distances until the color spreads through a certain portion of an adjacent tile 805 and the color has a certain intensity level. As the color spreads, its affect on the pixels decreases. Thus, if the color contribution on the pixels in the tile is below the threshold, the electronic device may choose not to calculate the geodesic distance on the adjacent tile or tiles since the effect of the color brushstroke on those pixels is not appreciable.

In one embodiment, instead of calculating the geodesic distance of the tiles based on the spread of the color, the electronic device may perform a pre-calculation to predict the spread of the color and only calculate the geodesic distance for the tiles within the predicted spread. For example, based on the size of the brushstroke, the electronic device may use a predefined estimate of the spread of the color. This estimate may not, for example, consider the boundaries and thus may be a simple calculation to perform (e.g., a radius around the brushstroke). The electronic device may then calculate the geodesic distance of the tiles within this estimate at the same time or sequentially based on the diffusion of the color.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method, comprising:
    Identifying, using one or more processing devices, a location in a display screen where a user action simulates a brushstroke;
    determining, based on the location of the simulated brushstroke, a geodesic distance between a first pixel in the location and a second pixel outside of the location in the display screen;
    determining a contribution of a color associated with the simulated brushstroke to the second pixel based on a color diffusion relationship, the color diffusion relationship comprising (i) a color diffusion component defining, based on the geodesic distance, an effect of the color of the simulated brushstroke on a color of the second pixel and (ii) a time component providing, based on the geodesic distance, a delay between when the simulated brushstroke is identified and when the color associated with the simulated brushstroke affects the color of the second pixel; and
    displaying the color in the second pixel based at least in part on the color diffusion relationship.

2. The method of claim 1, rendering, after identifying the location of the simulated brushstroke, a series of visual images illustrating the color of the brushstroke diffusing towards the second pixel based on the delay provided by the time component in the color diffusion relationship.

3. The method of claim 1, wherein determining the geodesic distance comprises:
    determining a physical distance between the first pixel and the second pixel in the display screen, wherein the first pixel is the closest one of a plurality of pixels in the location of the simulated brushstroke to the second pixel;
    determining a weighting factor based on a boundary of an image located between the first and second pixels; and
    combining the physical distance and the weighting factor to determine the geodesic distance.

4. The method of claim 3, wherein the weighting factor is configured to at least one of limit or prevent the color associated with the simulated brushstroke to diffuse across the boundary of the image.

5. The method of claim 3, wherein the boundary of the image is not rendered as part of the image displayed on the display screen.

6. The method of claim 1, further comprising:
    dividing the display screen into a grid of tiles;
    determining geodesic distances of pixels within a first tile of the grid that is adjacent to a second tile of the grid; and
    determining when to calculate geodesic distances of pixels within the second tile of the grid based upon a spread of the color of the simulated brushstroke in the pixels of the first tile.

7. The method of claim 1, wherein displaying the color in the second pixel comprises:
    identifying at least two colors from at least two different simulated brushstrokes affecting the color of the second pixel; and
    mixing the at least two colors to determine the color of the second pixel based on a color model.

8. A tangible non-transitory computer-readable storage medium comprising computer-readable program code executable by one or more computer processors to perform an operation, the operation comprising:
    identifying a location in a display screen where a user action simulates a brushstroke;

determining, based on the location of the simulated brushstroke, a geodesic distance between a first pixel in the location and a second pixel outside of the location in the display screen;

determining a contribution of a color associated with the simulated brushstroke to the second pixel based on a color diffusion relationship, the color diffusion relationship comprising (i) a color diffusion component defining, based on the geodesic distance, an effect of the color of the simulated brushstroke on a color of the second pixel and (ii) a time component providing, based on the geodesic distance, a delay between when the simulated brushstroke is identified and when the color associated with the simulated brushstroke affects the color of the second pixel; and displaying the color in the second pixel based at least in part on the color diffusion relationship.

9. The computer-readable storage medium of claim 8, wherein the operation further comprises rendering, after identifying the location of the simulated brushstroke, a series of visual images illustrating the color of the brushstroke diffusing towards the second pixel based on the delay provided by the time component in the color diffusion relationship.

10. The computer-readable storage medium of claim 8, wherein determining the geodesic distance comprises:

determining a physical distance between the first pixel and the second pixel in the display screen, wherein the first pixel is the closest one of a plurality of pixels in the location of the simulated brushstroke to the second pixel;

determining a weighting factor based on a boundary of an image located between the first and second pixels; and combining the physical distance and the weighting factor to determine the geodesic distance.

11. The computer-readable storage medium of claim 10, wherein the weighting factor is configured to at least one of limit or prevent the color associated with the simulated brushstroke to diffuse across the boundary of the image.

12. The computer-readable storage medium of claim 10, wherein the boundary of the image is not rendered as part of the image displayed on the display screen.

13. The computer-readable storage medium of claim 8, wherein the operation further comprises:

dividing the display screen into a grid of tiles;

determining geodesic distances of pixels within a first tile of the grid that is adjacent to a second tile of the grid; and determining when to calculate geodesic distances of pixels within the second tile of the grid based upon a spread of the color of the simulated brushstroke in the pixels of the first tile.

14. The computer-readable storage medium of claim 8, wherein displaying the color in the second pixel comprises:

identifying at least two colors from at least two different simulated brushstrokes affecting the color of the second pixel; and mixing the at least two colors to determine the color of the second pixel based on a color model.

15. A system, comprising:

a display screen;

a computer processor; and a memory containing a program that, when executed on the computer processor, performs an operation comprising:

identifying a location in the display screen where a user action simulates a brushstroke;

determining, based on the location of the simulated brushstroke, a geodesic distance between a first pixel in the location and a second pixel outside of the location in the display screen;

determining a contribution of a color associated with the simulated brushstroke to the second pixel based on a color diffusion relationship, the color diffusion relationship comprising (i) a color diffusion component defining, based on the geodesic distance, an effect of the color of the simulated brushstroke on a color of the second pixel and (ii) a time component providing, based on the geodesic distance, a delay between when the simulated brushstroke is identified and when the color associated with the simulated brushstroke affects the color of the second pixel; and displaying the color in the second pixel based at least in part on the color diffusion relationship.

16. The system of claim 15, wherein the operation further comprises rendering, after identifying the location of the simulated brushstroke, a series of visual images illustrating the color of the brushstroke diffusing towards the second pixel based on the delay provided by the time component in the color diffusion relationship.

17. The system of claim 15, wherein determining the geodesic distance comprises:

determining a physical distance between the first pixel and the second pixel in the display screen, wherein the first pixel is the closest one of a plurality of pixels in the location of the simulated brushstroke to the second pixel;

determining a weighting factor based on a boundary of an image located between the first and second pixels; and combining the physical distance and the weighting factor to determine the geodesic distance.

18. The system of claim 17, wherein the weighting factor is configured to at least one of limit or prevent the color associated with the simulated brushstroke to diffuse across the boundary of the image.

19. The system of claim 17, wherein the boundary of the image is not rendered as part of the image displayed on the display screen.

20. The system of claim 15, the operation further comprising:

dividing the display screen into a grid of tiles;

determining geodesic distances of pixels within a first tile of the grid that is adjacent to a second tile of the grid; and determining when to calculate geodesic distances of pixels within the second tile of the grid based upon a spread of the color of the simulated brushstroke in the pixels of the first tile.

21. The system of claim 15, wherein displaying the color in the second pixel comprises:

identifying at least two colors from at least two different simulated brushstrokes affecting the color of the second pixel; and mixing the at least two colors to determine the color of the second pixel based on a color model.

* * * * *